United States Patent
Baret et al.

(10) Patent No.: US 10,161,557 B2
(45) Date of Patent: Dec. 25, 2018

(54) CRYOGENIC FLUID TRANSFER LINE

(71) Applicant: L'Air Liquide, Societe Anonyme pour l'Etude et l'Exploitation des Procedes Georges Claude, Paris (FR)

(72) Inventors: Fabien Baret, Fontaine (FR); Stephane Duval, Saint Appolinard (FR)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 172 days.

(21) Appl. No.: 15/123,905

(22) PCT Filed: Feb. 24, 2015

(86) PCT No.: PCT/FR2015/050438
§ 371 (c)(1),
(2) Date: Sep. 6, 2016

(87) PCT Pub. No.: WO2015/132503
PCT Pub. Date: Sep. 11, 2015

(65) Prior Publication Data
US 2017/0108160 A1    Apr. 20, 2017

(30) Foreign Application Priority Data
Mar. 6, 2014    (FR) .................................... 14 51829

(51) Int. Cl.
*F16L 59/075*    (2006.01)
*F16L 59/14*    (2006.01)
*F16L 59/08*    (2006.01)

(52) U.S. Cl.
CPC ........... *F16L 59/141* (2013.01); *F16L 59/075* (2013.01); *F16L 59/08* (2013.01)

(58) Field of Classification Search
CPC ......... F16L 59/06; F16L 59/065; F16L 59/07; F16L 59/075; F16L 59/185
(Continued)

(56) References Cited

U.S. PATENT DOCUMENTS

| 2,930,407 A | 3/1960 | Conley et al. |
| 3,343,035 A | 9/1967 | Garwin |

(Continued)

FOREIGN PATENT DOCUMENTS

| EP | 1 020 678 | 7/2000 |
| FR | 2 803 898 | 7/2001 |

OTHER PUBLICATIONS

International Search Report and Written Opinion for PCT/FR2015/050438, dated May 28, 2015.

(Continued)

*Primary Examiner* — Patrick F Brinson
(74) *Attorney, Agent, or Firm* — Christopher J. Cronin

(57) ABSTRACT

Cryogenic fluid transfer line comprising a tubular outer jacket housing at least two interior fluid-transfer tubes and a heat shield forming an insulating wall arranged around the interior tubes, the outer jacket comprising a lateral pumping opening connected to a pumping member intended to pull a vacuum in the outer jacket, characterized in that the heat shield comprises an orifice situated adjacent to the opening and an optical cover, the optical cover being positioned facing the orifice and in a plane distinct from that of the wall of the heat shield so as to prevent or limit direct thermal radiation from the outer jacket toward the interior tubes.

13 Claims, 1 Drawing Sheet

(58) Field of Classification Search
USPC .......................................... 138/149, 148, 114
See application file for complete search history.

(56) References Cited

U.S. PATENT DOCUMENTS

| | | |
|---|---|---|
| 3,743,760 A | 7/1973 | Sassin |
| 3,808,351 A | 4/1974 | Moisson-Franckhauser et al. |
| 3,945,215 A | 3/1976 | Johnson et al. |
| 2010/0252698 A1 | 10/2010 | Dye et al. |

OTHER PUBLICATIONS

French Search Report and Written Opinion for FR 1 451 829, dated Nov. 17, 2014.

CRYOGENIC FLUID TRANSFER LINE

CROSS-REFERENCE TO RELATED APPLICATIONS

This application is a § 371 of International PCT Application PCT/FR2015/050438, filed Feb. 24, 2015, which claims § 119(a) foreign priority to French patent application FR1451829, filed Mar. 6, 2014.

BACKGROUND

Field of the Invention

The present invention relates to a cryogenic-fluid transfer line.

The invention relates more particularly to a cryogenic-fluid transfer line comprising a tubular outer jacket housing at least two inner fluid-transfer tubes and a heat screen forming an insulating wall positioned around the inner tubes, the outer jacket comprising a lateral pumping opening connected to a pumping member intended to form a vacuum in the outer jacket.

Related Art

Cryogenic-fluid transfer lines generally comprise an outer jacket housing, within its evacuated internal volume, one or more tubes (pipes) conveying fluid at cryogenic temperature (for example between 4 K and 80 K) and a thermal insulation system.

Documents FR2803898A1 and EP1020678A1 illustrate examples of details of cryogenic-fluid transfer lines.

The system for thermally insulating such lines generally comprises a heat screen (sometimes also referred to as a "cold screen") comprising a conducting wall (made of aluminum or the like) arranged around the tube or tubes and cooled ("thermalized") for example via contact with a cold tube (at 80 K for example).

The thermal insulation system also generally comprises multilayer thermal insulation arranged between the heat screen and the outer jacket.

The heat screen is centered in the outer jacket via separator members arranged at regular intervals along the entire length thereof and held on one of the tubes which is used for the thermalization thereof via points distributed along the length. Likewise, the fluid-transfer tube or tubes are held in place via fixed and sliding points arranged transversely in the outer jacket.

In order to create a vacuum in the outer jacket 2, the latter generally comprises a lateral pumping opening 5 connected to a pumping member 6.

The pumping thus draws out the gas:
from the space comprised between the multilayer insulation and the outer jacket,
through the multilayer insulation,
between the gaps in the heat screen (which gaps are caused by the fact that the structure of the heat screen is made up of portions assembled end to end).

The pumping from the internal volume of the cold screen (where the tubes that carry the fluid are to be found) is therefore greatly slowed and limited by the pressure drops and conductance in the insulating layer and between the joints of the heat screen. This may have a strong influence on the ultimate thermal performance of the transfer line because the desired minimum pressure level is then not necessarily reached at certain points, and this is true whatever the pumping capability used.

SUMMARY OF THE INVENTION

It is an object of the present invention to alleviate all or some of the abovementioned disadvantages of the prior art.

To this end, the transfer line according to the invention, in other respects in accordance with the generic definition given thereof in the above preamble, is essentially characterized in that the heat screen comprises an orifice situated adjacent to the opening, and an optical cover, the optical cover being positioned facing the orifice and in a plane distinct from that of the wall of the heat screen, so as to prevent or limit direct thermal radiation from the outer jacket toward the inner tubes.

This orifice thus forms a favored path for the pumped gas making it possible to increase the conductance across the heat screen and therefore improve the effectiveness of the pumping and therefore of the vacuum and the ultimate thermal performance of the cryogenic line.

Furthermore, some embodiments of the invention may have one or more of the following features:
the optical cover is dimensioned and positioned relative to the orifice to intercept all the rectilinear optical rays starting from the outer jacket and heading toward the inner tubes through the orifice, namely that, whatever the viewing angle, the outer jacket cannot be seen directly by the inner tubes through the orifice,
the optical cover comprises a layer of thermal insulation material, notably a multilayer structure (MLI),
the optical cover comprises a sheet of heat-conducting material, notably a metal, of copper or of aluminum, and in that said sheet is thermalized, namely cooled by contact and conduction with a cold part of the transfer line used for thermalizing the heat screen,
the heat screen is thermalized, namely cooled by contact and thermal conduction with one of the inner tubes,
the optical cover comprises a sheet of heat-conducting material thermalized by the heat screen, namely cooled by contact and conduction with the heat screen,
in a direction transverse to the line, the optical cover is situated between the heat screen and the inner tubes,
in a direction transverse to the line, the optical cover is situated between the heat screen and the outer jacket,
the bore section of the orifice has a surface area of between 0.8 times and five times the surface area of the bore section of the lateral opening,
the space situated between the optical cover and the heat screen may be between once and five times the bore section of the orifice,
in a direction transverse to the line, the orifice of the heat screen is situated facing the opening of the outer jacket or in a zone adjacent to the portion of the heat screen situated facing said opening,
the optical cover is cooled by contact and conduction with the heat screen via at least one connection braid made of heat-conducting material, notably at least one selected from: copper, aluminum,
the optical cover is rigidly connected to the heat screen via at least one connecting rod,
the heat screen is thermalized at a temperature of between 50 K and 100 K, and preferably of between 70 K and 90 K,
the optical cover is thermalized at a temperature of between 50 K and 100 K, and preferably of between 70 K and 90 K,
the heat screen comprises a cylindrical wall formed of tubular portions or tubular half-portions mounted and held in the outer jacket via spacer members,
the line comprises members for holding the at least one inner tube, the holding members being arranged transversely in the outer jacket and comprising a respective passage for the at least one inner tube, the line extends in a longitudinal direction, in a direction transverse to the line, the optical cover is situated in a plane distinct from the at least one layer of thermal insulation and situated notably in a plane parallel to the longitudinal direction of the line, in a direction transverse to the longitudinal direction of the line, the optical cover is situated between the at least one layer of thermal insulation and the at least one tube or between the outer jacket and the at least one layer of thermal insulation, the layer of thermal insulation comprises a multilayer structure, notably comprising several layers of screen and of intermediate layers, the invention may also relate to any alternative method or device comprising any combination of the features listed above or below.

Further specifics and advantages will become apparent from reading the description hereinafter, given with reference to the figures in which:

DETAILED DESCRIPTION OF THE INVENTION

Figure 1:
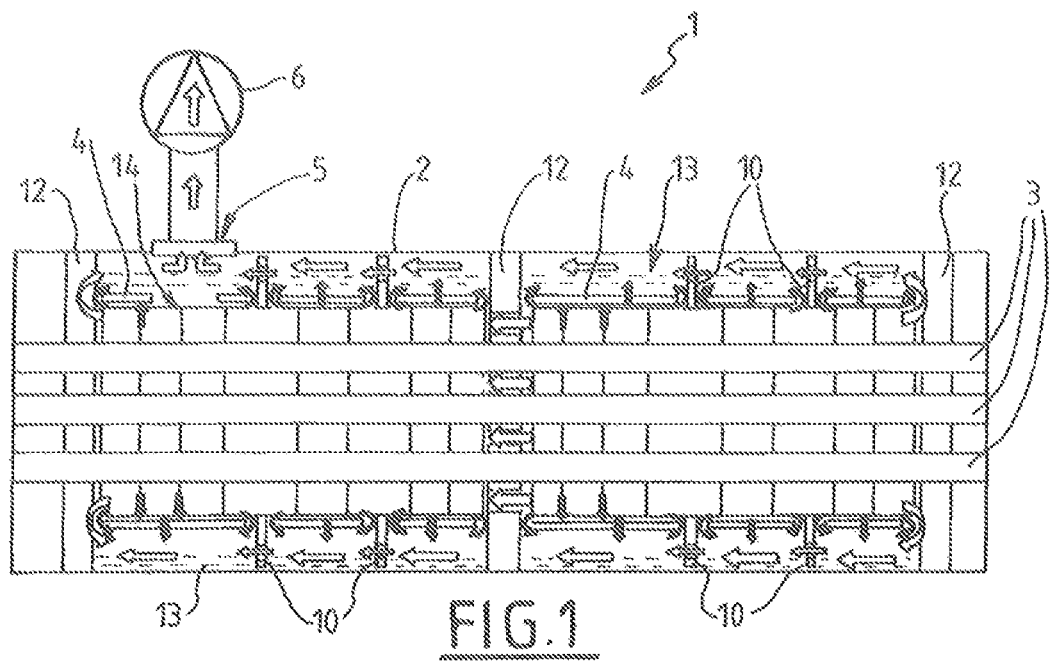
FIG. 1 depicts a schematic and partial view in longitudinal section illustrating one example of the structure and of the operation of a portion of cryogenic-fluid transfer line according to the invention.

FIG. 1 illustrates one example of a section of cryogenic-fluid transfer line.

This device in the conventional way comprises a tubular outer jacket 2 housing, in this example, a number of inner tubes 3 which are intended respectively to carry cryogenic fluids. This portion of line illustrated by way of nonlimiting example comprises three inner tubes 3 kept parallel via fixed or sliding retaining members 12 (for example, sheets mounted transversely and comprising passages to accept the tubes 3). The term "transverse" refers to a direction perpendicular to the "longitudinal" direction which is parallel to the longitudinal axis of the line and of the tubes (direction in which the fluids flow).

The outer jacket 2 also houses a heat screen 4 forming an insulating wall around the inner tubes 3. The heat screen 4 keeps the tubes 3 sheltered from the external radiation at 300 K. The heat screen 4 is, for example, made up of cylindrical portions or semi-portions assembled end to end to form a cylindrical sheath around the tubes. The heat screen 4 is, for example, centered by spacer members 10 which bear against the outer jacket 2 and are held on one of the tubes 3 which is used to thermalize (which means to say cool) the heat screen 4, via fixed and sliding points.

The heat screen 4 is preferably made of aluminum, copper or any other suitable material and is preferably thermalized, namely cooled or kept at a determined temperature by contact and conduction with a cold source, notably one of the transfer tubes 3. For example, the heat screen is kept at a temperature of the order of 80 K.

Thermal insulation 13 is also provided inside the inner jacket 2, notably between the heat screen 4 and the outer jacket 2. This insulation 13, symbolized by dotted lines in the figures, may comprise a multilayer structure known per se ("MLI" which stands for "multilayer insulation") comprising several alternating layers of aluminum foil (screen) and interlayers of paper or submicron glass fiber, polyester or the like.

The screen layers may be of the type known per se, notably: aluminum, Mylar® (polyester) double-sided flexible aluminized sheet, Kapton®.

The interlayers may notably be of the type including: polyester netting, Lydall®, Dextar®, Bolloré®.

Other suitable insulation systems may be provided.

In the conventional way, the outer jacket 2 comprises a lateral pumping opening 5 connected to a pumping member 6, for example a vacuum pump.

The pumping member 6 is intended to create a vacuum in the internal volume of the outer jacket 2.

According to one advantageous particular feature, the heat screen 4 comprises an orifice 14 situated adjacent to the pumping opening 5 to facilitate the pumping and the creation of a relative vacuum in the interior volume of the outer jacket 2.

The orifice 14 is preferably created in line with (facing) the opening 5 and the pumping port. Of course, the orifice 14 may be slightly offset from the opening 5 longitudinally or transversely but it is preferably situated as close as possible to the opening 5. That makes it possible to improve the pumping times, the overall level of pressure in the evacuated jacket and therefore the overall thermal performance of the cryogenic line.

In order to avoid or limit the ingress of heat via this orifice 14, notably via radiation from the outer jacket 2 (which is, for example, at a temperature of 300 K) toward the inner tubes 3, the line 1 preferably comprises a cover 7 referred to as an "optical cover".

Figure 2:
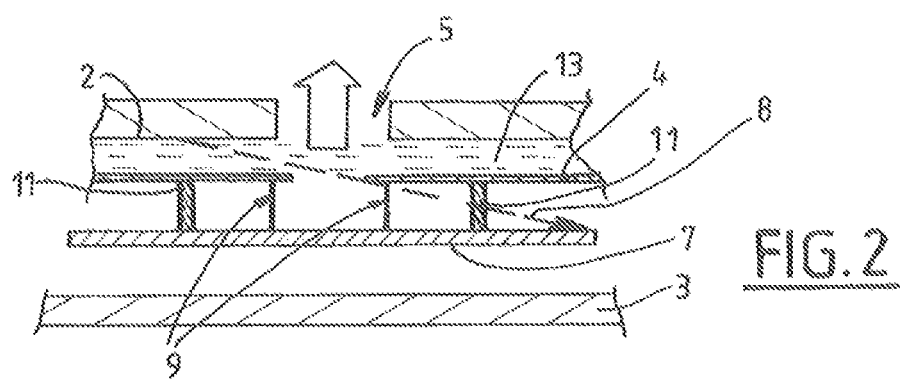
FIG. 2 depicts a schematic and partial view in section illustrating a detail of the line of FIG. 1, according to a first embodiment of an orifice provided with a heat-screen cover.

As illustrated in FIG. 2, the optical cover 7 is positioned facing the orifice 14 and preferably in a plane distinct from that of the wall of the heat screen 4. The optical cover 7 forms a barrier to prevent or limit direct thermal radiation from the outer jacket 2 toward the inner tubes 3.

In the example of FIG. 2, the optical cover is situated between the heat screen 4 and the outer jacket 2.

For preference, the optical cover 7 is dimensioned and positioned relative to the orifice 14 to intercept all the rectilinear optical rays 8 starting from the outer jacket 2 and heading toward the inner tubes 3 through the orifice 14. What that means to say is that, whatever the viewing angle, the outer jacket 2 is preferably not directly visible by the inner tubes 3 through the orifice 14.

For example, the bore section of the orifice 14 has a surface area of between 0.8 times and five times the surface area of the bore section of the opening 5, and notably of between once and four times the surface area of the bore section of the opening 5.

Likewise, the annular space situated between the optical cover 7 and the heat screen 4 may be between once and five times the bore section of the orifice 5. What that means to say is that the bore section area situated between the periphery of the optical cover 7 and the heat screen 4 allowing the gas to reach the orifice 14 is preferably between once and five times the surface area of the bore section of the opening 5. This bore section area between the optical cover 7 and the screen 4 is given by: distance between the optical cover 7 and the heat screen 4 multiplied by the perimeter of the optical cover 7.

The optical cover 7 may be rigidly connected to the heat screen 4 via at least and preferably two connecting rods 9 and preferably several rods 9 and notably threaded rods 9.

The optical cover 7 may comprise a sheet of heat-conducting material, notably made of a metal, of copper or of aluminum, and this sheet is preferably thermalized, namely cooled by contact and conduction with a cold part of the transfer line, notably the heat screen 4.

In addition to the connecting rods 9, the optical cover 7 may be cooled by contact and conduction with the heat screen 4 via one or more connecting braid(s) 11 made of heat-conducting material, notably at least one selected from: copper, aluminum.

Likewise, the optical cover 7 may have at least one thickness of thermal insulator, for example of the same kind as the insulator of the insulation layer 13 situated between the heat screen 4 and the outer jacket 2.

This arrangement allows effective pumping (the pumped-gas outlet is symbolized by an arrow in FIG. 2, while at the same time limiting the ingress of heat into the evacuated insulated line 1).

FIG. 1 symbolizes, using a multitude of arrows, the various passages of the stream of pumped gas in the segment of the cryogenic line 1.

Figure 3:
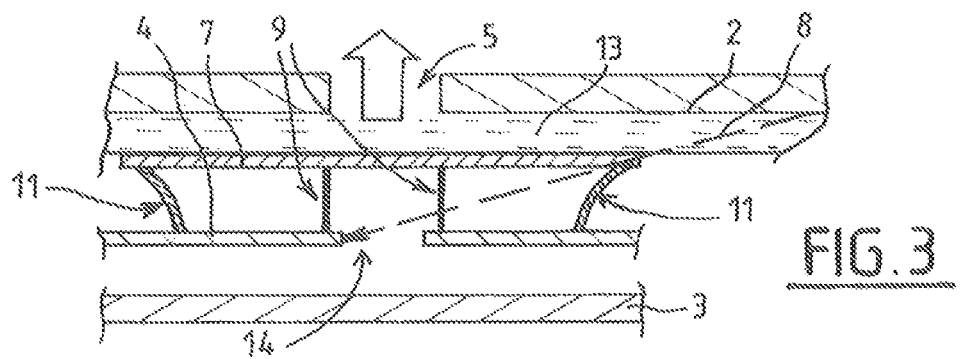
FIG. 3 depicts a schematic and partial view in section illustrating a detail of the line of FIG. 1, according to a second embodiment of an orifice provided with a heat-screen cover.

The example in FIG. 3 differs from that of FIG. 2 only in that the optical cover 7 is situated between the heat screen 4 and the inner tubes 3. What that means to say is that the optical cover 7 is situated inside the volume of the heat screen 4. For the sake of conciseness, elements identical to those described previously are denoted by the same numerical references and are not described a second time. These two alternatives notably make it possible for the location of the optical cover 7 to be adapted to suit the space available in the line 1.

It will therefore readily be appreciated that, while being of simple and inexpensive structure, the invention makes it possible advantageously to resolve the problems of the prior art.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising," "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A cryogenic-fluid transfer line comprising:
   at least two inner fluid-transfer tubes;
   a tubular outer jacket housing said least two inner fluid-transfer tubes, the outer jacket comprising a lateral pumping opening intended to be connected to a pumping member intended to form a vacuum in the outer jacket;
   a heat screen forming an insulating wall positioned around the inner tubes, the heat screen comprising an orifice situated adjacent to the opening;
   at least one layer of thermal insulation situated inside the outer jacket; and
   an optical cover distinct from said at least one layer of thermal insulation, the optical cover facing the orifice so as to prevent or limit direct thermal radiation from the outer jacket toward the inner tubes, wherein the optical cover is dimensioned and positioned relative to the orifice to intercept any rectilinear optical rays starting from the outer jacket and heading toward the inner tubes through the orifice such that, whatever the viewing angle, the outer jacket cannot be seen directly by the inner tubes through the orifice.

2. The line of claim 1, wherein, the optical cover is situated in a plane distinct from the at least one layer of thermal insulation and situated notably in a plane parallel to the longitudinal direction of the line.

3. The line of claim 2, wherein, the optical cover is situated between the at least one layer of thermal insulation and the at least one tube or between the outer jacket and the at least one layer of thermal insulation.

4. The line of claim 1, wherein the layer of thermal insulation comprises a multilayer structure.

5. The line of claim 1, wherein the optical cover comprises multiple layers of thermal insulation material distinct said at least one layer of thermal insulation situated inside the outer jacket.

6. The line claim 1, wherein the optical cover comprises a sheet of heat-conducting material made of a metal and is cooled by contact and conduction with the heat screen.

7. The line of claim 1, wherein the optical cover comprises a sheet of heat-conducting material cooled by conduction with the heat screen via one or more connecting braid made of heat-conducting material.

8. The line of claim 1, wherein, the optical cover is situated between the heat screen and the inner tubes.

9. The line of claim 1, wherein, the optical cover is situated between the heat screen and the outer jacket.

10. The line of claim 1, wherein a radial bore section of the orifice has a surface area of between 0.8 times and five times a surface area of a bore section of the lateral opening.

11. The line of claim 1, wherein a space situated between the optical cover and the heat screen is between one and five times a bore section of the orifice.

12. The line of claim 1, wherein, in a direction transverse to the line, the orifice of the heat screen is situated facing the opening of the outer jacket or in a zone adjacent to the portion of the heat screen situated facing said opening.

13. The line of claim 1, wherein the optical cover is rigidly connected to the heat screen via at least one connecting rod.

* * * * *